Figure 1:
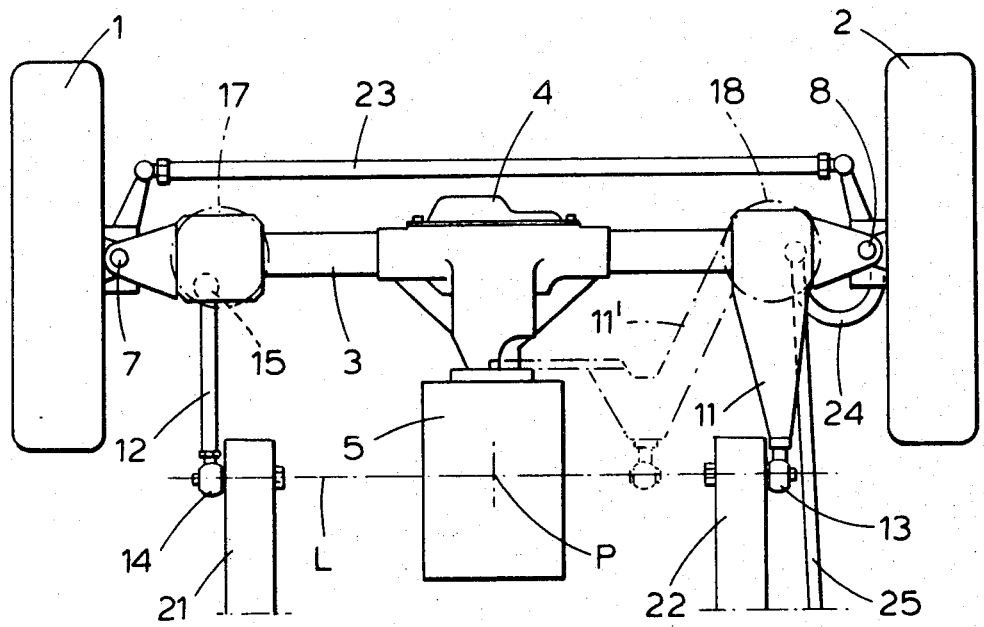

United States Patent [19]

Capjon

[11] 4,235,300
[45] Nov. 25, 1980

[54] FRONT WHEEL SUSPENSION FOR ELECTRIC VEHICLES WITH FRONT WHEEL DRIVE

[75] Inventor: Jan W. Capjon, Spro, Norway

[73] Assignee: A/S Strømmens Vaerksted, Strømmen, Norway

[21] Appl. No.: 16,212

[22] Filed: Feb. 28, 1979

[30] Foreign Application Priority Data

Mar. 17, 1978 [NO] Norway ............................. 780969

[51] Int. Cl.³ .................................................. B60K 7/00
[52] U.S. Cl. ................................ 180/254; 180/54 F; 180/62; 180/292
[58] Field of Search ................. 180/252, 253, 264, 57, 180/56, 55, 73 R, 75, 254, 62, 65 R, 291, 292, 54 F; 280/666, 671, 672

[56] References Cited

U.S. PATENT DOCUMENTS

| | | | |
|---|---|---|---|
| 1,178,144 | 4/1916 | Fend | 180/57 |
| 1,223,495 | 4/1917 | Kelley | 180/57 |
| 2,001,029 | 5/1935 | Kulick et al. | 180/57 |
| 2,013,599 | 9/1935 | Butler | 180/57 |
| 2,227,379 | 12/1940 | Quartullo | 180/57 |
| 3,917,016 | 11/1975 | Stoufflet | 180/57 |

*Primary Examiner*—John J. Love
*Assistant Examiner*—Donn McGiehan
*Attorney, Agent, or Firm*—Ladas & Parry

[57] ABSTRACT

Front wheel suspension for electric vehicles with front wheel drive, comprising at least two arms provided between a rigid front axle and frame members of the vehicle, at least one of said arms being articulated to the axle and all arms extending mainly horizontally from the axle and being connected to the frame members by means of ball joints, a differential unit arranged at the central part of the axle between the arms, an electromotor mounted directly on the differential unit and extending away from the axle mainly horizontally and in the same direction as the arms so that the center of gravity of the motor is all the time lying substantially stationary on a line through said ball joints, and springs in the form of helical springs or rubber springs provided between the axle and the frame members.

7 Claims, 6 Drawing Figures

FRONT WHEEL SUSPENSION FOR ELECTRIC VEHICLES WITH FRONT WHEEL DRIVE

This invention primarily relates to electric vehicles for use for example within the post administration, public services, on railway stations and air-ports and the like, where a simple and inexpensive design is of much importance. For such purposes it is, moreover, of interest to note that the vehicles employed need rarely be designed for driving at high speeds.

In vehicles for the above purposes it is common practice that the front wheels are steerable; whereas the rear wheels are used for traction. However, front wheel drive may also be found in such cases the front wheels are independently suspended.

It is previously known in rear wheel driven vehicles to couple the traction motor directly to the differential gear housing of the drive axle so that the reduction ratio between crown wheel and pinion in the differential gear provides for the necessary step-down between the motor and the drive or traction wheels. This solution inter alia involves the problem that when there is need for springs between the axle and the vehicle frame or body, the so-called non-suspended mass or unsprung weight (the axle with wheels and motor) will be so large that the system will have a very low natural frequency which results in uncomfortable spring function. Besides, the long distance between the centre of gravity of the motor and the centreline of the axle will cause vibrations in the whole axle during spring deflection, for example when leaf springs are employed. Such a solution therefore is not suitable with front wheel drive, where the springing characteristics are more critical than for the rear wheels.

From German Pat. No. 946,591 it is additionally known with rear wheel drive to reduce the unsprung weight by mounting the motor with a pivot at the front side of the motor, this solution being based on an independent wheel suspension and the employment of leaf springs. The solution cannot be used with front wheel drive and the reduction in the unsprung weight is not optimised.

Moreover, in German Pat. No. 884,608, relating to an arrangement with a stiff rear axle having a motor mounted thereon by a flange coupling and leaf springs, there is shown at the upper side of the motor a bracing arm which counteracts vibrations induced by the mass of the motor. This arrangement, however, does not eliminate the motor's contribution to the unsprung weight, since the centre of gravity of the motor moves up and down during the movement of the axle.

Thus, an object of this invention is to obtain a maximum of simplification of the front suspension in electric vehicles with front wheel drive, by employing a rigid front axle, at the same time as satisfactory driving characteristics are maintained.

What is novel and specific to the front wheel suspension according to this invention primarily consists in the combination of

- at least two arms provided between a rigid front axle and frame members of the vehicle, at least one of said arms being articulated to the axle and all arms extending mainly horisontally from the axle and being connected to the frame members by means of ball joints,
- a differential unit arranged at the central part of the axle between the arms,
- an electromotor mounted directly on the differential unit and extending away from the axle mainly horisontally and in the same direction as the arms so that the centre of gravity of the motor is all the time lying substantially stationary on a line through said ball joints, and
- springs in the form of helical springs or rubber springs provided between the axle and the frame members.

With the solution stated above there is obtained a particularly simple and inexpensive front suspension which results in a very high degree of flexibility with respect to the design or arrangement of the remaining parts of the vehicle. The unsprung weight will be reduced so that satisfactory springing properties may be obtained. A specific advantage consists therein that the arrangement together with necessary controls can be designed as a self-contained unit or module, which can be built into various types of vehicles, for example for luggage transport in air-ports, transport of invalides etc. This module therefore can be manufactured independently of the intended field of use.

That arm which in one embodiment is rigidly connected to the axle, is dimensioned and shaped in such a way as to be able to transfer bending moments due to acceleration, braking and centrifugal forces, directly from the axle to the frame. With such a rigid arm there is further obtained a necessary control of the rocking movements of the motor about its centre of gravity at the same time as the commonly used stabilising arms for rigid axles can be eliminated. This suspension arrangement will also eliminate vibrations caused by a "front heavy" axle.

Figure 2:
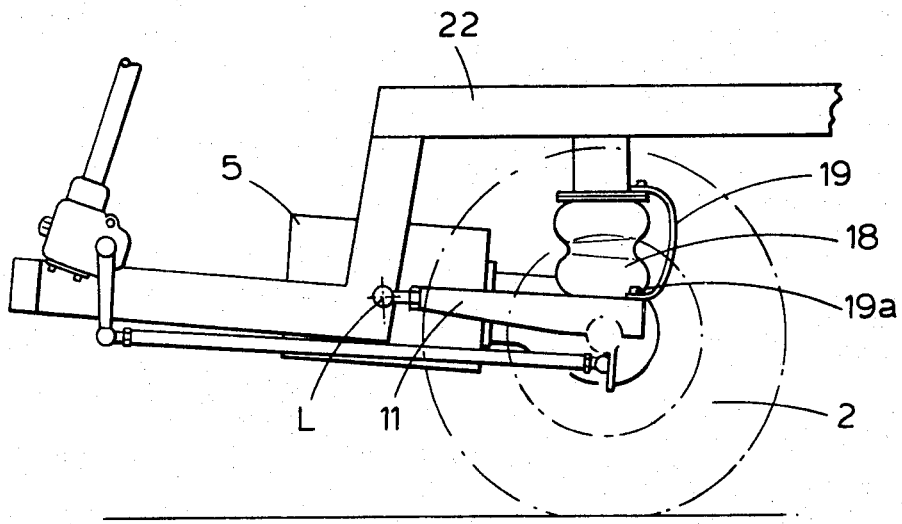
Figure 3A:
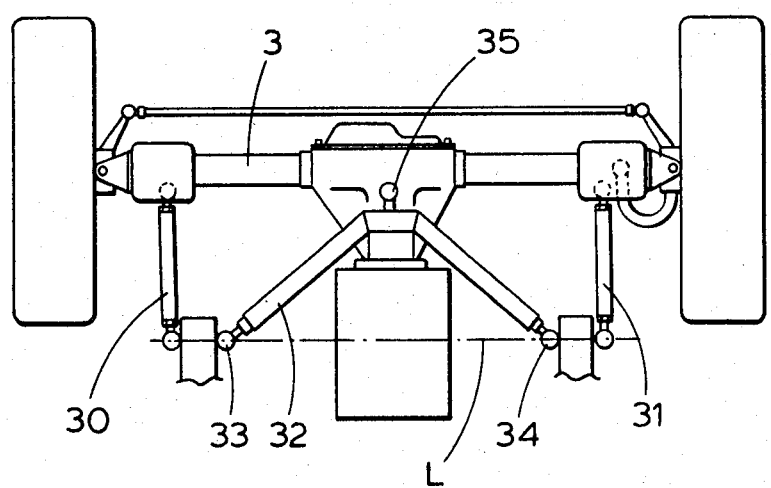
Figure 3B:
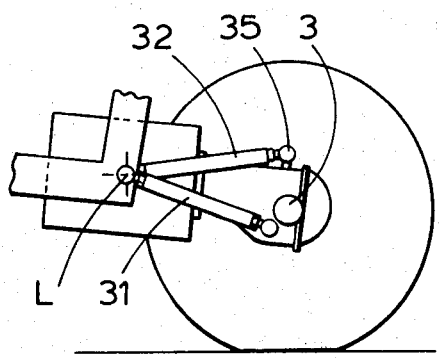
Figure 3C:
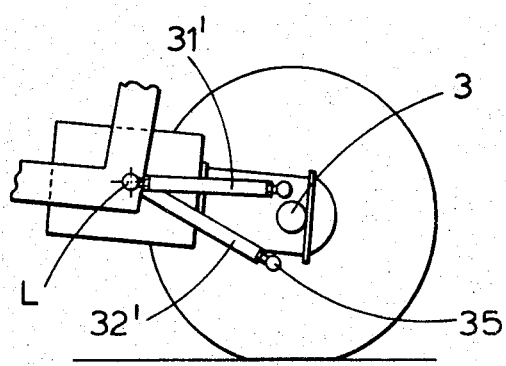
Figure 4:
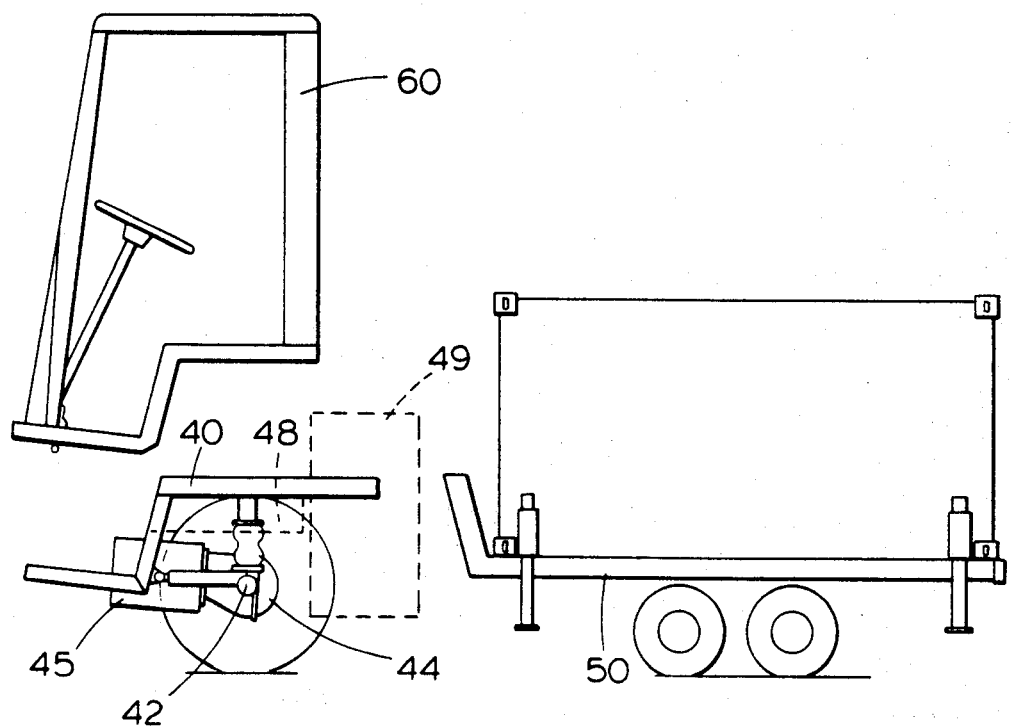

In the following the invention is to be explained more in detail with reference to the drawings, in which:

FIG. 1 shows an example of a suspension arrangement according to a first embodiment of the invention, seen from above, FIG. 2 shows the arrangement of FIG. 1 in elevation, FIGS. 3a, 3b, and 3c respectively, show in a way similar to FIGS. 1 and 2 modifications of a second embodiment according to the invention, FIG. 4 shows an arrangement according to the invention designed as a unitary or integral module intended for assembly with other vehicle parts to form a complete vehicle.

In FIG. 1 there are shown two front wheels 1 and 2 having hubs mounted on a rigid front axle 3 with a differential unit 4 on which there is mounted in a cantilever fashion an electromotor 5 being directly flanged to the differential housing. In the usual way the wheel hubs are pivoted at the ends of the axle 3 by means of ball joints. Moreover, there is shown a steering arrangement of conventional type comprising a parallel rod 23, a steering arm 24 and a steering drag rod 25 from a conventional steering gear with its Pitman arm (not shown), which can also be mounted at the rear of the axle if desirable.

The suspension of the rigid axle 3 with the components moving together with the axle, is effected by means of a first arm or bracket 11 which is rigidly connected to the axle 3 at one side thereof. Besides, the bracket 11 is through a ball joint 13 connected to a frame member 22 at a point in distance forwardly of the axle 3 seen in the driving direction of the vehicle. At the other end of the axle 3 there is provided a second arm 12 which is mounted with ball joints 14 and 15 respectively, at the ends. In FIG. 1 there is indicated a transverse line L which interconnects the ball joints 13 and 14. As already mentioned the centre of gravity P of the motor 5 shall lie substantially on the line L. This results in an advantageous pattern of movement during the spring function in the vehicle, since the large mass represented by the motor 5 mounted in a cantelever fashion will not be subjected to vertical movements of any significant magnitude, but will only have small rocking movements with line L as an axis.

With the rigid joint between the bracket 11 and the axle 3 it is necessary for the arm 12 to be articulated to the axle so that vertical spring movement will be possible for both wheels simultaneously as well as for only one of the wheels at a time.

There are provided helical springs or rubber springs 17 and 18 in a way known per se between spring supports on the upper side of the axle 3 and the frame members 21 and 22 respectively. Possibly there may also be provided shock-absorbers in the usual way. A connection in the form of a limiting strap 19 attached to a point 19a at the rear edge of the spring support surfaces will on the one hand in the usual way prevent too much down-stroke of the axle in large road hollows, and will on the other hand counteract too strong reactions in the ball joint 13 during high accelerations.

An alternative design of the bracket 11 is indicated with broken lines (at 11') in FIG. 1. The object of this design is to have the vertical reactions in the ball joint 13 located closure to the centre-line of the vehicle—if this should be desirable for example in embodiments having a particularly powerful motor.

In the embodiment shown in FIGS. 3a, 3b and 3c respectively, the above mentioned arm or bracket 11 or 11' respectively, has been replaced by an arm 30 corresponding to the arm 12, i.e. being articulated at both ends. The arm 30 and the corresponding arm 31 at the other end of the axle are, in one modification, attached to the underside of the axle as shown in the elevation view in FIG. 3b. For orientation of the axle in relation to the frame there are provided additional arms in the form of a rigid yoke 32 which is mounted pivotably in ball joints 33 and 34 which are located on the line L. The yoke 32 is also connected to the axle 3 at the upper side of the differential housing by means of a ball joint 35. As to other components and elements shown in FIGS. 3a, and 3b as well as in FIG. 3c, these are the same as those found in FIG. 1. The embodiments of FIGS. 3a, 3b and 3c respectively, are somewhat more complicated than the first embodiment, but the articulated arms 30, 31 as well as the yoke 32 in FIGS. 3a and 3b have a similar function as the previously described rigid arm or bracket 11 with respect to the rocking movement of the motor about its centre of gravity and the forces to which the axle is subjected. The solution will also remove some of the stresses from the axle itself and can for example be favourable in cases where the axle has small dimensions.

It is obvious that the articulate connection between the arms 30, 31 and the yoke 32 respectively, and the axle or the differential housing respectively, can be inverted in relation to the arrangement of FIGS. 3a and 3b. Thus, in FIG. 3c such an inverted modification is shown in which the yoke 32' is articulated to the underside of the differential housing and the arms 30', 31' are articulated to the upper side of the axle 3.

Finally FIG. 4 shows how the suspension arrangement according to the invention can be built as a self-contained unit or module intended for incorporation into a complete vehicle which is based upon such a module. Thus, the module in FIG. 4 comprises a frame 40, an axle with wheels 42, a differential gear housing 44 and an electromotor 45. To make this module complete it is also provided with electrical circuits 48 for regulator, rectifier, contactor and power feed functions to the extend such functions are applicable in the vehicle concerned. Traction batteries 49 possibly with advantage can be located at another suitable place in the remaining parts of the vehicle, taking into account inter alia the question of a favourable weight distribution, and can be connected to the electrical circuits 48 and the motor 45 by means of cables. In FIG. 4 there is shown a cargo unit 50 with wheels and frame intended to be joined to the frame 40, whereas a driver's cabin 60 with steering and other controls is adapted to be mounted above the module unit described containing the main components for the steering and propulsion of the complete vehicle.

I claim:

1. Front wheel suspension for electric vehicles with front wheel drive and steering, characterised by the combination of
   at least two arms provided between a rigid front axle and frame members of the vehicle, at least one of said arms being articulated to the axle and all arms extending mainly horizontally from the axle and being connected to the frame members by means of ball joints,
   a differential unit arranged at the central part of the axle between the arms,
   an electromotor mounted directly on the differential unit and extending away from the axle as a cantilever mainly horizontally and in the same direction as the arms so that the centre of gravity of the motor is all the time lying substantially stationary on a line (L) through said ball joints, and
   springs provided between the axle and the frame members.

2. Front wheel suspension according to claim 1, characterised in that one arm is articulated to the axle and a second arm is rigidly connected to the axle.

3. Front wheel suspension according to claim 1, characterised in that two arms are articulated to the axle, and in that there are provided additional arms formed as a rigid yoke mounted on the one hand in ball joints at points of the frame members lying on said line, and on the other hand in a ball joint on the differential unit.

4. Front wheel suspension according to claim 1, characterised in that the arms are directed forwardly and also the electromotor extends forwardly with respect to the axle.

5. Front wheel suspension according to claim 1, characterised in that there is provided a generally vertical limiting strap between a point at the opposite side of the axle with respect to the direction in which the arms extend, and a point at a frame member thereabove.

6. Front wheel suspension according to claim 1, characterized in that it is designed as an integral module built on a frame and containing all necessary main components for traction, steering and control of a vehicle, including electrical regulation, rectification, contactor and feeding circuits.

7. An electric vehicle including a front wheel suspension according to claim 1, wheels mounted on said axle at opposite ends thereof respectively and means for applying steering effort to the wheels for steering the vehicle.

* * * * *